US006383383B1

United States Patent
Novak

(10) Patent No.: US 6,383,383 B1
(45) Date of Patent: May 7, 2002

(54) COMBINATION CYCLONIC SEPARATOR AND MULTI-STAGE FILTER AND PUMP

(75) Inventor: Mark G. Novak, West Des Moines, IA (US)

(73) Assignee: Water Creations, Inc., Des Moines, IA (US)

( * ) Notice: Subject to any disclaimer, the term of this patent is extended or adjusted under 35 U.S.C. 154(b) by 0 days.

(21) Appl. No.: 09/886,527

(22) Filed: Jun. 21, 2001

(51) Int. Cl.[7] .................. B01D 36/00; B01D 36/04; B04C 9/00
(52) U.S. Cl. ............... 210/304; 210/306; 210/320; 210/416.1; 210/512.1
(58) Field of Search .................. 210/416.1, 304, 210/306, 320, 512.1

(56) References Cited

U.S. PATENT DOCUMENTS

| 192,313 | A | * | 6/1877 | Watson |
| 2,258,063 | A | * | 10/1941 | Meyer |
| 3,819,053 | A | * | 6/1974 | Milotich |
| 4,306,521 | A | * | 12/1981 | Giles |

FOREIGN PATENT DOCUMENTS

GB 2213811 * 8/1989

* cited by examiner

Primary Examiner—Thomas M. Lithgow
(74) Attorney, Agent, or Firm—Henderson & Sturm LLP

(57) ABSTRACT

A combination cyclonic separator, multi-stage filter and pump is disposed within a cylindrical housing disposed around a vertical axis. A fluid inlet in a bottom portion of the housing causes the water to circulate with greater flow on the outside of the housing than on the inside thereof, thereby causing debris suspended within the water to accumulate closer to the inside and bottom than to the outside and top of this portion of the housing. A plurality of plates causing the flow to go between a first plate and the inner wall of the housing and through an opening in the inside of the second plate serves as part of a second stage of filtering large particles. A third plate disposed above the second plate forces water again between the periphery of the second plate and the inner wall of the housing to complete a preferred embodiment of the second stage filtration. A filter media is interposed in the housing after the second stage and catches the finer particles suspended in the water. A pump is disposed in the housing above the filter media and has preferably another filter on the inlet thereof. The inlet to the housing is larger than the outlet of the pump, thereby causing the inlet to be low pressure and lower flow, thereby being less turbulent.

17 Claims, 2 Drawing Sheets

COMBINATION CYCLONIC SEPARATOR AND MULTI-STAGE FILTER AND PUMP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to a combination cyclonic separator, multi-stage filter and pump within a housing and more particularly to such a device which is adapted for use in back yard ponds or the like.

2. Background Art

Water gardening has become increasingly popular wherein homeowners have small ponds, typically in their back yard. A major problem in water gardening is keeping the water in balance. Debris such as leaves, sticks and animal wastes make this very difficult. Traditional pond vacuums remove water from the pond, thus causing the need to add large amounts of water back into the pond and potentially disrupting the water balance.

In water gardens, one of the biggest challenges is removing heavy or large debris. Larger debris is very hard to remove because it can clog a pump. If a pump is used that chops up the debris, then it is harder to separate the debris from the water.

Consequently there is a need for a pond vacuum, which overcomes the aforementioned disadvantages.

BRIEF SUMMARY OF THE INVENTION

The present invention relates to a combination cyclonic separator, multi-stage filter and pump within a cylindrical housing disposed around a vertical axis. A fluid inlet in a bottom cyclonic separator portion of the housing causes the water to circulate, with greater flow on the outside of the housing than on the inside thereof, thereby causing debris suspended within the water to accumulate closer to the inside and bottom than to the outside and top of this portion of the housing. A plurality of plates are disposed above the cyclonic separator, causing the flow to pass between a first plate and the inner wall of the housing and through an opening in the inside of the second plate. These plates serve as part of a second stage of filtering large particles. A third plate, disposed above the second plate, forces water between the periphery of the third plate and the inner wall of the housing to complete a preferred embodiment of the second stage of filtration. A filter media is interposed in the housing after the second stage and catches finer particles suspended in the water. A pump is disposed in the housing above the filter media and has, preferably, another filter on the inlet thereof.

The present invention thereby removes the debris without chopping it up or clogging the pump. This permits the use of a much less expensive pump. It is also easier to filter out the larger particles of debris than it would be to capture small particles. Also, the inlet to the housing is larger than the outlet of the pump, thereby causing the inlet to be at low pressure and low flow, thereby being less turbulent than, for example, the pump outlet. It is therefore possible to vacuum up small living animals and not fatally harm them.

The large intake hose allows high volume/low pressure flow into the housing. The curvature of the housing allows the fluid stream to create cyclonic action in Stage 1, Level 1 of the cleaning process. This forces the heavier material to converge in the center where water is the slowest and cleaner water is forced to the outer edge. In Stage 2, Level 2, fluid is pulled from the outer edges of Level 1, the cleanest part of the fluid in Level 1. The liquid then passes between the first filter disc, and the inside of the housing, inside of the second filter disc and then outside of the third filter disc. These filter discs act as a physical barrier to the larger pieces of debris, such as leaves.

When the liquid leaves the Level 2 multi disc filter, it encounters a Level 3 which is a filter media such as a medium density foam disc. When the liquid stream comes in contact with this medium density foam, it is slowed and dispersed through the foam. This causes additional debris to become trapped within the foam disc.

Remaining debris particles are further filtered by a filter material wrapped around the pump inlet. Consequently when the fluid enters the pump and is expelled out of the housing and back into the original pond, it has been effectively filtered before passing through the pump and thereby completing the cleaning cycle without losing any valuable fluid.

DETAILED DESCRIPTION OF THE INVENTION

Figure 1:
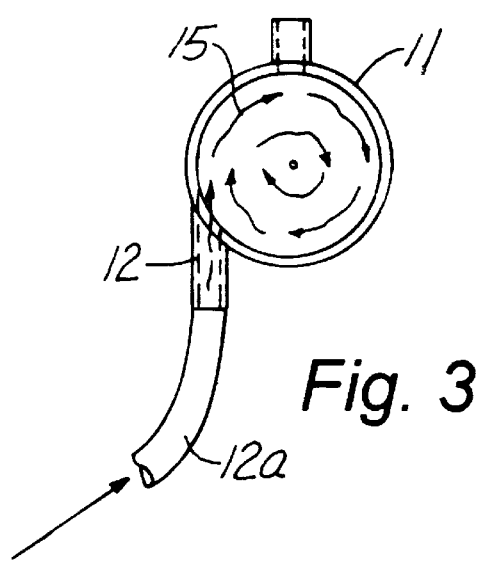
FIG. 1 is a side elevational view of the present invention.
Figure 2:
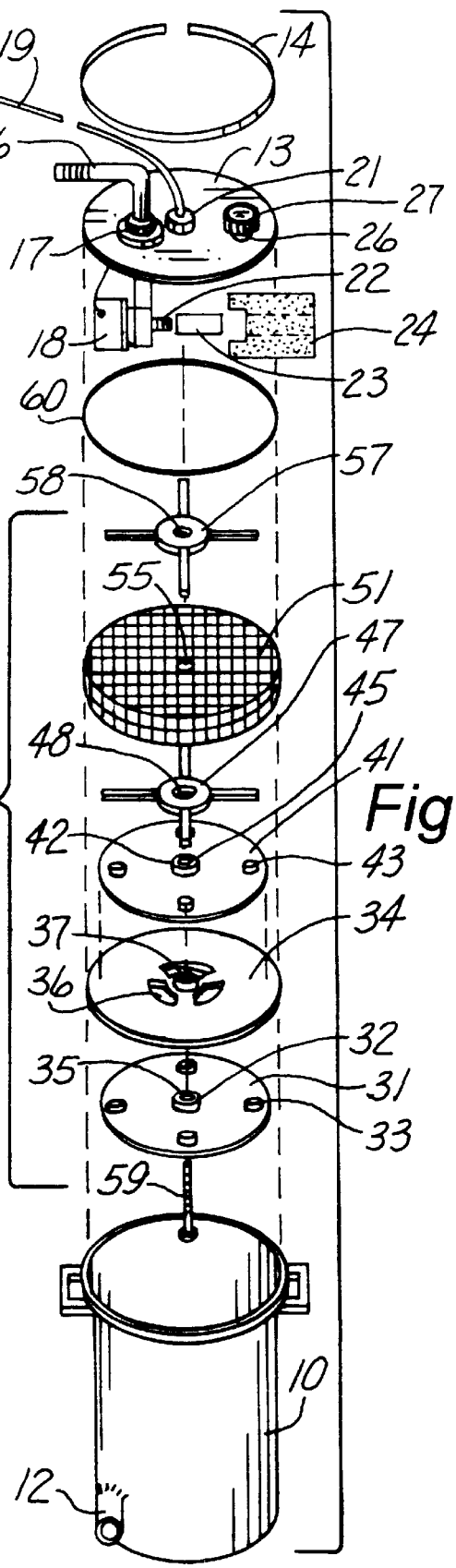
FIG. 2 is an exploded perspective view of the various parts of the present invention.
Figure 4:
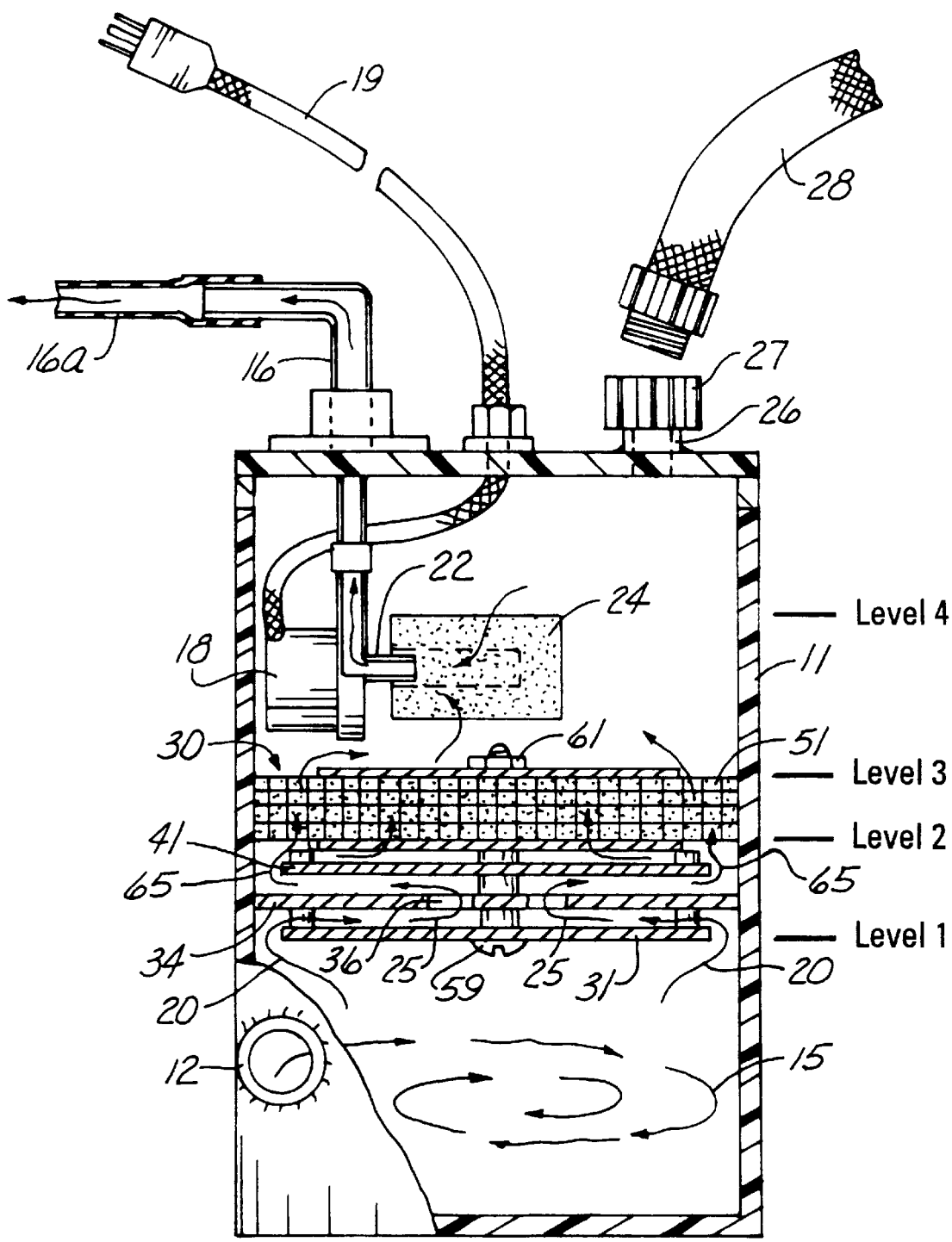
FIG. 4 is a side elevational view with most of the front sidewall removed to show the inside thereof.

Referring now to the drawings wherein like reference numerals designate identical or corresponding parts throughout the several views, FIG. 1 shows a combination cyclonic separator, multi-stage filter and pump (10) constructed in accordance with the present invention. A cylindrical housing (11) has an inlet fitting (12) thereon and a lid (13). Referring to FIGS. 1, 2 and 4, a clamp (14) is used to hold the lid (13) to the housing (11). The lid (13) has an opening for receiving a pump outlet pipe (16) through a fitting (17) leading to a pump (18). The pump (18) has a cord (19) which is sealed by a fitting (21) to the lid (13). The pump (18) also has an inlet (22), a filter holder (23) and a foam filter (24), to filter out fluid going to the pump (18). A threaded fill tube (26) has a cap (27) for selectively sealing the top (13) or to attach a garden hose (28) shown in FIG. 4 instead of having the cap (27) thereon, thereby allowing water to be added to the container housing (11) or to backwash the filter elements, which will be discussed below.

Referring now to the lower end of FIG. 2, a first disc (31) has a spacer portion (32) and a plurality of other spacer members (33) disposed around the exterior thereof for abutment with a second disc (34) having openings (36) on the interior thereof. The first disc (31) has a central opening (35) in alignment with the central opening (37) on the second disc (34). A third disc (41) is identical to the first disc (31) and has a central opening (45) through a spacer (42) and outer spacer members (43).

A filter media (51) can be made of a medium foam and has an opening (55) in the center thereof. This foam member (51) can have multiple layers if desired, but should be at least as large in diameter as the inside diameter of the housing (11). Similarly, as can be seen in FIG. 4, the disc (34) is substantially the same diameter as the inside diameter of the housing (11) so that when the filter assembly (30) shown in FIGS. 2 and 4 are placed in the positions shown in FIG. 4, the disc (34) and media filter (51) will, by friction, hold the assembly (30) in place in the position shown in FIG. 4. Spacers (47) and (57) are identical and have openings (48) and (58) therein so that a bolt (59) extending through openings (35), (37), (45), (48), (55) and (58) as shown in FIG. 4 and having a nut (61) threadably engaging a bolt (59) will hold the entire assembly (30) in place in the position shown in FIG. 4. O-ring (60) shown in FIG. 2 can be used to seal the lid (13) to the top of housing (11).

Figure 3:
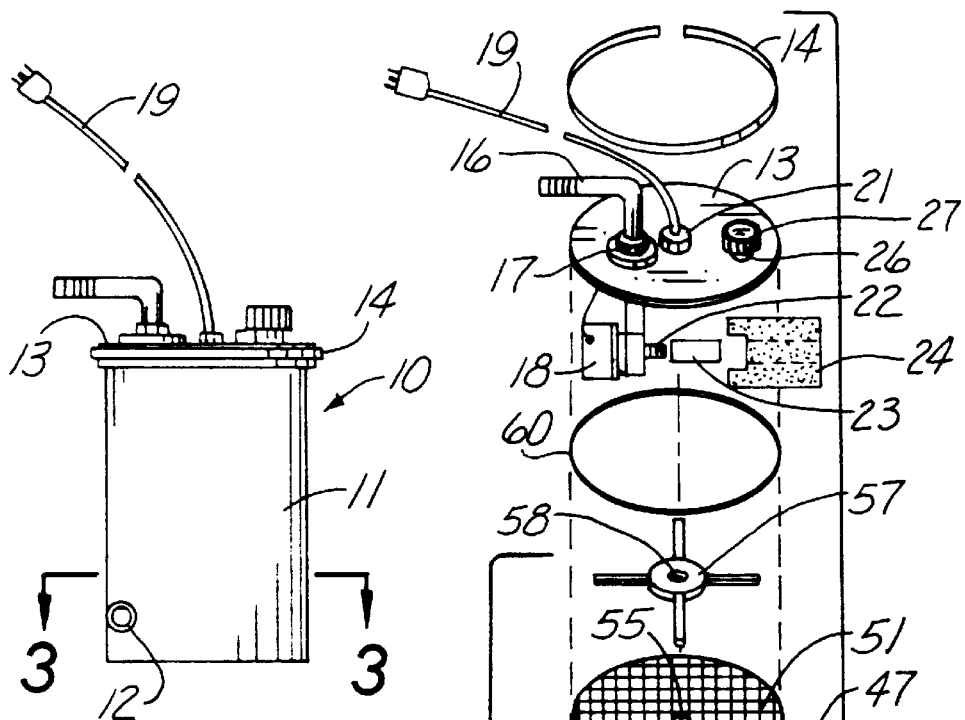
FIG. 3 is a cross sectional view taken along line 3—3 of the present invention and showing the cyclonic action of the liquid inside of the container by the arrows.

In operation of the apparatus (10) shown in FIGS. 1–4, the inlet hose (12a) shown in FIG. 3 would be in the pond and the outlet hose (16a) shown in FIG. 4 could dump back into a water gardening pond or the like. Consequently that permits the device (10) to be placed outside the water gardening pond if desired.

Once the immediately above-identified arrangement is made, the apparatus (10), which can also be called a cyclonic pond vacuum, is turned on by activating the pump (18), for example, by plugging it into an electrical source. The housing (11) is first filled with water, through hose (28) and inlet (26). With the cap (27) in place, the water is then pumped out through outlet (16) and outlet hose (16a) thereby sucking water in through the inlet hose (12a) and through inlet (12). This causes the cyclonic action illustrated in FIGS. 3 and 4 whereby the water is directed along the side walls. This circular motion will be faster around the edges of the interior of housing (11) than in the center thereof, thereby causing the debris suspended in the water to be located at the lower center portion of the housing (11), close to the arrows (15). Consequently, the cleanest water will be approximately at the top outer portion of the cyclonic part of the housing (11) at the top of Level 1.

The flow entering Level 2 is shown by arrows (20). Consequently debris can be trapped between the outer periphery of the first disc (31) and the interior of the housing (11). As the arrows (25) indicate, the flow then continues through the second disc (34) through inner openings (36). The space between the first disc (31) and the second disc (34) can cause larger pieces of debris such as leaves or the like to be caught therein and the small openings (36) in disc (31) can also catch larger debris. The flow continues through the space between discs (31) and (41) as shown by arrows (65) thereby creating still another place where debris can be trapped between the discs (34) and (41).

After the water flows in the place where arrows (65), are located, the water will pass through filter media (51), which is preferably a medium foam abutting the interior walls of the housing (11). It can be seen that between Level 1 and Level 2 there is a filtering of larger particles of debris and that the filtering between Level 2 and Level 3 filters even finer particles. The water, which has passed through the filter media (51), enters the upper portion of the housing adjacent an even finer filter (24) located over the inlet (22) of pump (18). Consequently, the water or other fluid has been filtered in four stages from Levels 1, 2, 3 and 4 before it enters the pump (18). It is of course possible to eliminate one of the stages and still be constructed in accordance with the present invention as expressed in the attached claims.

Accordingly the preferred embodiment does indeed solve the aforementioned problems. Obviously, many modifications and variations of the present invention are possible in light of the above teachings. It is therefore to be understood that, within the scope of the appended claims, the invention may be practiced otherwise than as specifically described.

I claim:

1. Apparatus comprising:
   a cylindrical housing disposed around a substantially vertical axis, said housing having a top, a bottom and sidewalls interconnecting said top and bottom for forming a container for receiving a liquid, said sidewalls having a first portion, a second portion and an intermediate portion between the first and second portions;
   a fluid inlet disposed at an angle substantially tangent to an imaginary cylinder which is smaller than but concentric with said cylindrical housing whereby liquid will be caused to flow in a circular path within the first portion of said cylindrical housing causing particles suspended in said fluid to flow towards the vertical axis and cleaner fluid to be disposed nearer to the sidewalls of the housing;
   a fluid outlet operably disposed in the housing;
   a first circular plate disposed in a flow path between said fluid inlet and said fluid outlet, said first circular plate having a diameter less than the diameter of an inner wall of said housing immediately surrounding said first plate whereby liquid will flow between an outer periphery of said first plate and said inner wall of the housing;
   a second plate spaced from said first plate, said second plate having an exterior periphery substantially in abutment with said inner wall of the housing and at least one opening portion between the exterior periphery thereof and said vertical axis whereby liquid will flow into said at least one opening portion from a space between said first and second plates;
   a third plate disposed closer to said second plate than to said first plate and spaced from said second plate, said third plate being substantially solid and of a diameter closer to the diameter of said first plate than the diameter of said second plate whereby flow from said at least one opening portion will flow between said third plate and said inner wall of the housing;
   a filter media disposed in said housing closer to said third plate than to said second plate and spaced from said third plate, said filter media effectively being disposed with respect to the inner wall of the housing so all of the fluid flow must pass therethrough; and
   a pump disposed in said housing for causing flow from the fluid inlet to the fluid outlet.

2. The apparatus of claim 1 including a back flush opening adjacent the top for filling the container with liquid and optionally for back washing said filter media or closing the opening when not in use.

3. The apparatus of claim 1 wherein said pump is positioned between the filter media and the top of the housing, said pump having a pump inlet inside of said housing above said filter media and a pump outlet in sealed liquid communication with the outlet of said housing.

4. The apparatus of claim 3 wherein a pump filter is operatively attached to the pump inlet.

5. The apparatus of claim 3 in combination with a second container for containing a liquid, said liquid inlet being in fluid communication with said second container for drawing a liquid from said second container.

6. The apparatus of claim 5 wherein said pump outlet dumps into said second container.

7. The apparatus of claim 6 wherein the fluid inlet is larger than the pump outlet for causing less turbulent flow into said container than out from said pump.

8. The apparatus of claim 1 wherein the distance between the first and second plates is approximately the distance between said outer periphery of the first plate and the inner wall of the housing.

9. The apparatus of claim 8 wherein the distance between the second plate and the third plate is substantially the same as the distance between the first and second plates.

10. Apparatus comprising:
a cylindrical housing disposed around a substantially vertical axis, said housing having a top, a bottom and sidewalls interconnecting said top and bottom for forming a container for receiving a liquid, said sidewalls having a bottom portion, a top portion and an intermediate portion between the top and bottom portions;
a fluid inlet disposed in said bottom portion of the sidewalls, said liquid inlet being disposed at an angle substantially tangent to an imaginary cylinder which is smaller than but concentric with said cylindrical housing whereby liquid will be caused to flow in a circular path within the lower portion of said cylindrical housing causing particles suspended in said fluid to flow towards the vertical axis and cleaner fluid to be disposed nearer to the sidewalls of the housing;
a fluid outlet operably disposed in one of the top and top portion of the housing;
a first circular plate disposed above said fluid inlet and having a diameter less than the diameter of an inner wall of said housing immediately surrounding said first plate whereby liquid will flow between an outer periphery of said first plate and said inner wall of the housing;
a second plate disposed above and spaced from said first plate, said second plate having an exterior periphery substantially in abutment with said inner wall of the housing and at least one opening portion between the exterior periphery thereof and said vertical axis whereby liquid will flow into said at least one opening portion from a space between said first and second plates;
a third plate disposed above and spaced from said second plate, said third plate being substantially solid and of a diameter closer to the diameter of said first plate than the diameter of said second plate whereby flow from said at least one opening portion will flow between said third plate and said inner wall of the housing;
a filter media disposed in said housing above and spaced from said third plate, said filter media effectively being disposed with respect to the inner wall of the housing so all of the fluid flow must pass therethrough; and
a pump disposed in said housing between the filter media and the top of the housing, said pump having a pump inlet inside of said housing above said filter media and a pump outlet in sealed liquid communication with the outlet of said housing.

11. The apparatus of claim 10 including a back flush opening adjacent the top for filling the container with liquid and optionally for back washing said filter media or closing the opening when not in use.

12. The apparatus of claim 10 wherein a pump filter is operatively attached to the pump inlet.

13. The apparatus of claim 10 in combination with a second container for containing a liquid, said liquid inlet being in fluid communication with said second container for drawing a liquid from said second container.

14. The apparatus of claim 13 wherein said pump outlet dumps into said second container.

15. The apparatus of claim 14 wherein the fluid inlet is larger than the pump outlet for causing less turbulent flow into said container than out from said pump.

16. The apparatus of claim 10 wherein the distance between the first and second plates is approximately the distance between said outer periphery of the first plate and the inner wall of the housing.

17. The apparatus of claim 16 wherein the distance between the second plate and the third plate is substantially the same as the distance between the first and second plates.

* * * * *